Aug. 16, 1932.                G. D. HAYDEN                1,872,584
                                LUBRICATOR
                            Filed Jan. 23, 1928
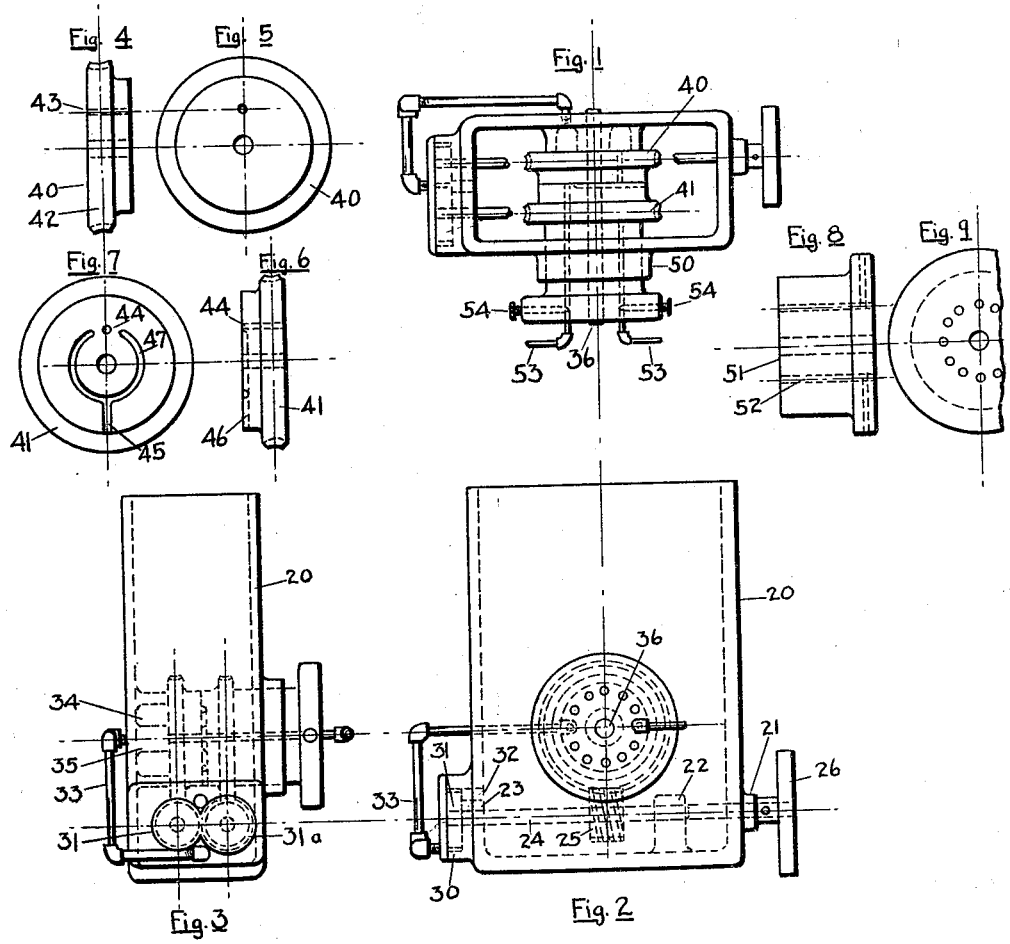
INVENTOR
George D Hayden Patented Aug. 16, 1932

1,872,584

UNITED STATES PATENT OFFICE

GEORGE D. HAYDEN, OF DETROIT, MICHIGAN

LUBRICATOR

Application filed January 23, 1928. Serial No. 248,631.

The present invention relates to a metering and distributing device, designed especially for lubrication of machines where each point to be lubricated is supplied with the lubricant at predetermined intervals and in predetermined quantities.

Among the objects of the invention is a device of the character described which admits of regulating the amount of lubricant accurately, and which distributes the desired amount to an individual bearing at predetermined intervals.

Another object of the invention is means whereby the intervals between lubrication may be made as long as desired, although the speed of operation of the device need not necessarily be very slow.

Other objects will readily occur to those skilled in the art upon reference to the following description and the accompanying drawing, in which:—

Figure 1 is a plan view of the device with certain parts broken away for clearness;

Figure 2 is a side elevation showing a phantom view of some of the parts;

Figure 3 is a similar end view of the device;

Figures 4 and 5 are respectively side and front elevations of one of the distributing disks;

Figures 6 and 7 are similar views of the other of the distributing disks;

Figures 8 and 9 are respectively side and end views of the header element.

As indicated in the drawing, the device comprises a container 20 having near its bottom, suitable bearings 21, 22 and 23 for drive shafts 24, each carrying a worm 25. Suitable driving means for the shaft is indicated as a pulley 26. The shafts 24 extend through the lower part of the casing into a small outer chamber 30 and carry gears 31 and 31a meshing together and serving to drive one of the shafts 24 from the other. These gears 31 are unequal in size, so that one of the shafts 24 is driven at a somewhat lower speed than the other, and are so arranged in chamber 30 as to form a gear pump which is provided with an inlet 32 leading from the inside of the container 20 into the chamber 30, and an outlet conduit 33 which leads from the chamber 30 to a small annular chamber 34 formed within one wall of the containr 20 and open thereto. The chamber 34 surrounds a boss 35 which furnishes a bearing for a shaft 36 mounted therein and extending through the opposite wall of the container, as shown in Figure 1. This shaft 36 carries in the form shown in Figures 1 to 9, two worm gears 40 and 41, cooperating with the worms 25 to be rotated thereby, and preferably in opposite directions. One of the gears 40 accordingly will be rotated at a somewhat slower speed than the other. The two gears 40 and 41 are shown in Figures 4–7 more in detail.

In Figures 4 and 5, gear 40 is shown as provided with the toothed portion 42 and to be somewhat thicker than this toothed portion and provided with a passage way 43 leading from one face to the other.

The gear 41 is shown as of substantially the same shape as gear 40 and with a passage way 44 leading from one face to the other, but gear 41 is also provided with a groove 45 leading from the periphery of the lateral extension 46 to an annular groove 47, which, however, is not a complete annulus but is stopped a short distance from the passage 44. Passages 43 and 44 in the two gears are the same radial distance from the centers and adapted to register at suitable intervals so as to form a continuous passage through both gears.

Gears 40 and 41 are loosely mounted on shaft 36 and adapted to contact with each other with their lateral extensions toward each other. The opposite face of gear 40 is so finished as to form a closure for chamber 34.

The wall of container 20 opposite the chamber 34 and boss 35 is provided with a large opening surrounded by a flange 50 for the reception of a header plug 51 adapted to fit tightly in said opening to effectively close the same and which is provided with an axial opening for passage of shaft 36. This plug member 51 is provided with a series of passage ways 52 located at the same radial distance from the center as passage ways 43 and 44 and adapted to register therewith under proper timing. Each one of the passage ways 52 is provided with means for the connection of conduits 53, each leading to its respective bearing or point of lubrication, and each is provided with a regulating valve 54.

From the foregoing description, it would seem quite clear that with lubricant within container 20, the operation of drive member 26 causes rotation at a relatively rapid rate of the gears 31 forming the pump and the consequent pumping of lubricant from the container 20 into chamber 34. The rotation at different rates of the gears 40 and 41 will cause the registry of passages 43 and 44 only at considerable intervals and then only for a short time. The location of passages 43, 44 and 52 is such that registry between passages 43 and 44 may take place opposite one of the passages 52 and when this occurs, pressure developed in chamber 34 by the pump causes a small amount of lubricant to flow through the three registering passages into the corresponding conduit 53 and thence to the particular point of lubrication. It is noted that although the holes in the discs cross each other twice each revolution the size of the holes and the distance between holes in the distributor or plug member 51 is such that registry between all three passages occurs only once every revolution of the discs.

In order to prevent the building up of pressure in chamber 34 to too great a degree, the annular passage 47 and outlet 45 in gear 41 has been provided. This passage provides a relief back into the container of pressure in the chamber, as the passage 43 remains in communication with the passage 47 most of the time when it is not in registry with passage 44. Reference to Figure 7 will show that on either side of passage 44, the gear 41 is provided with a short blind spot which allows some pressure to build up in chamber 34 during a short interval of time.

If it is desired to increase the time interval between the registration of the several passages and the consequent delivery of lubricant, the number of gears corresponding to 40 and 41 may be increased and the time of rotation of the several gears may be varied so that an almost infinite number of variations may be obtained.

Now having described the invention and the preferred form of embodiment thereof, it is to be understood that the said invention is to be limited not to the specific details herein set forth and illustrated, but only by the scope of the claims which follow.

I claim:—

1. A lubricating device comprising a reservoir, a plurality of outlets therefrom each leading to a bearing, means for forcing lubricant from said reservoir through said outlets and means for controlling the passage of lubricant to said outlets and permitting flow therethrough periodically in rotation, said latter means comprising rotatable discs each having a passage therethrough adapted to register with each other and with an outlet and means for rotating said discs in opposite directions and at different speeds.

2. In a lubricating device a container, a chamber connected therewith, a pump adapted to draw lubricant from said container and force it into said chamber, a plurality of outlet passages adapted to be opened to said chamber in turn and means for opening said outlets comprising a pair of rotatable discs each having a passage therethrough adapted to register with each other and with each of the outlets, means for rotating said discs at different speeds and in opposite directions whereby to cause such registry with said outlets in predetermined order.

3. In a lubricating device, a container, a pair of shafts mounted therein and geared together with different size gears whereby they rotate at different speeds, means for driving one of said shafts, a housing covering said gears and forming therewith a pump, an inlet passage thereto from said container, a pressure chamber connected to the outlet side of said pump and open on one side, a rotatable disc closing said open side, a coaxial rotatable disc contacting with the first disc, a plate contacting with the opposite side of said second disc and having an outlet passage therethrough adapted to be closed by said second disc, a passage through each of said discs adapted to register with each other and with said outlet passage, worm gear teeth on each of said discs, cooperating worms on each of said shafts, arranged to rotate said discs in opposite directions, and means to relieve the pressure in said chamber when said passages and outlet are out of registry.

4. In a lubricating device, a source of lubricant, a pump adapted to be continuously operated to draw lubricant from said source, a distributing device adapted to receive fluid therefrom and distribute said fluid through a plurality of outlets in predetermined order, said device including a rotating disc having a discharge opening therein, means for relieving the back pressure on said pump between successive discharges through said outlets comprising an annular channel in said disc communicating with said source of lubricant and interrupted for a portion of its circumference on either side of said discharge opening.

5. In a lubricating device, a source of lubricant, a pump connected thereto, a distributing device adapted to receive lubricant therefrom and distribute it to a plurality of outlets in a predetermined order of succession, and means for relieving back pressure on said pump in intervals between discharges from successive outlets, said means comprising a communication between the source of lubricant and the point of delivery of lubricant into the distributor and means to interrupt said communication prior to each discharge of lubricant from an outlet a sufficient time to allow building of a sufficient pressure to effect such discharge.

6. In combination, a casing having an inlet and an outlet, a plurality of superposed cooperating rotatable discs in said casing one of which overlies said outlet, each of said discs having an opening therein, the path of travel of said openings intersecting the axial line of said outlet, and means for driving said discs at unequal rates of rotation.

7. In combination, a casing having an inlet and an outlet, a plurality of contacting overlapping rotatable discs in said casing, each of said discs having an opening therein, the path of travel of said openings intersecting the axial line of said outlet, one of said discs being in sealing relation with respect to said outlet, and means for driving said discs each at a different rate of rotation.

8. In combination, a casing having an inlet and an outlet, a rotatable disc overlying said outlet and normally sealing the same, said disc having an opening therein adapted to be brought into alignment with said outlet once during each revolution of said disc, a second rotatable disc normally sealing the opening in the first mentioned disc, said second disc having an opening therein alignable with the opening on the first mentioned disc and means for driving said discs each at a different rate of rotation.

9. In combination, a casing having an inlet and an outlet, a rotatable disc overlying said outlet and normally sealing the same, said disc having an opening therein adapted to be brought into alignment with said outlet once during each revolution of said disc, a second rotatable disc concentric with the first mentioned disc and contacting thereagainst, said second disc normally sealing the opening in the first mentioned disc and itself being provided with an opening therethrough alignable with the opening in the first mentioned disc, and means for driving said discs each at a different rate of rotation.

10. In combination, a casing having an inlet passage and an outlet passage, a plurality of superposed contacting concentric rotatable discs disposed between said inlet and said outlet and normally sealing them from each other, each of said discs being provided with an opening therethru and all of said openings being of equal distance from the center of rotation of said discs and alignable with one of said passages, and means for simultaneously rotating said discs each at a different rate of rotation.

11. In combination, a casing having an inlet and an outlet, a track formed on the interior of said casing and upon which said outlet opens, a rotatable disc resting against said track and being provided with an opening alignable with said outlet, means for normally sealing said opening when in alignment with said outlet comprising a plurality of contacting like rotatable disc members one of which bears against the first mentioned disc, each of the last mentioned disc members having an opening therein alignable with each other and with said outlet, and means for driving said discs each at a different rate of rotation.

12. In combination, a pump including a casing and a rotatable pump element therein, a second casing secured to said pump casing and interiorly connected to the discharge side thereof, an outlet for said second casing, a plurality of cooperating rotatable means within said second casing normally sealing said outlet and adapted to intermittently uncover it, and a driving connection between said pump and said rotatable means adapted to drive at least two of said means at rates of speed different from each other.

13. In combination, an oil pump comprising a casing and a pair of gears, a second casing secured to said casing and being interiorly connected with the discharge side of said pump, an outlet for said second casing, a plurality of cooperating gear members normally sealing said outlet, and a pinion in said second casing concentric with and rotatable in direct accordance with one of said gears, said gear members each having an opening therein adapted to be intermittently aligned with each other and with said outlet.

GEORGE D. HAYDEN.